(No Model.)
G. W. KING.
TANK FOR THE STORING OF PETROLEUM.
No. 251,245. Patented Dec. 20, 1881.
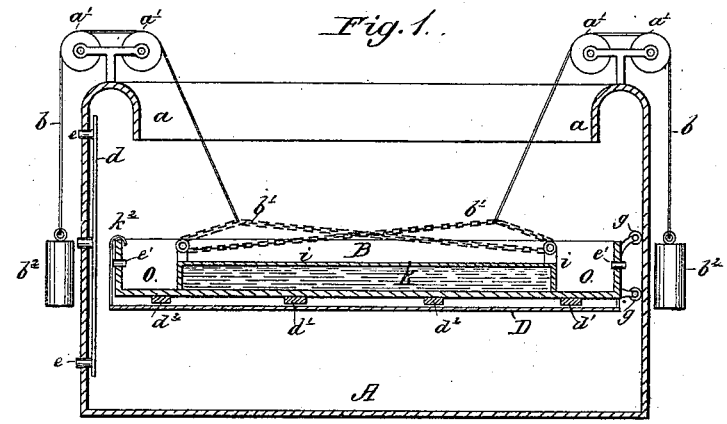
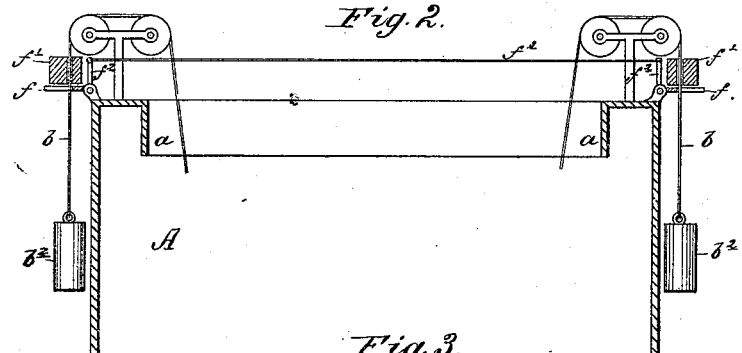
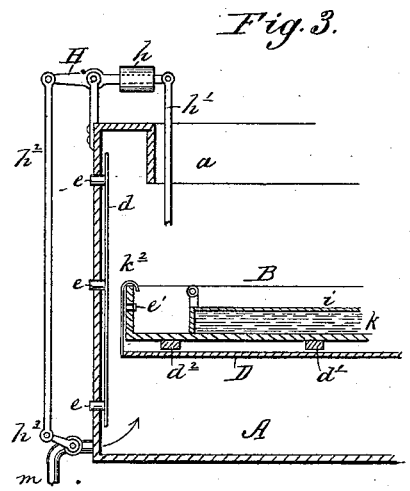
WITNESSES:
W. W. Hollingsworth
Edw. W. Byrn.
INVENTOR:
Geo. W. King
BY
ATTORNEYS.

UNITED STATES PATENT OFFICE.

GEORGE W. KING, OF GEORGETOWN, DISTRICT OF COLUMBIA.

TANK FOR THE STORING OF PETROLEUM.

SPECIFICATION forming part of Letters Patent No. 251,245, dated December 20, 1881.

Application filed May 3, 1881. (No model.)

*To all whom it may concern:*

Be it known that I, GEORGE W. KING, of Georgetown, District of Columbia, have invented a new and Improved Tank for Storing Petroleum; and I do hereby declare that the following is a full, clear, and exact description of the same, reference being had to the accompanying drawings, forming part of this specification, in which—

Figure 1 is a vertical central section of the tank and its lid or cover; Fig. 2, a vertical section of the upper portion of a tank, showing a modification of a part of my invention; and Fig. 3 is a vertical section of one side of the tank and its cover, showing mechanism for cutting off the inflow of oil by the elevation of the floating cover.

In the Patent No. 234,291, granted me November 9, 1880, I showed and described a petroleum-tank in which the upper edges of the tank were turned inwardly and downwardly to form a drooping flange, and in which a floating pan, filled with water and resting upon the oil-surface, was connected with and partially sustained by chains which passed over pulleys at the top of the tank and were attached to counter-weights on the outside, which lid or pan, when drawn up to the top of the tank, formed with the drooping flange a water-seal that tightly closed the tank, and which lid or pan served the purpose of cooling the surface of the oil, preventing evaporation, reduced the liability to explosion of the gas, and in case of fire was capable of tightly closing the opening in the top of the tank and extinguishing the flames. My present invention covers several features of improvement upon that patent, which consist, first, in means for automatically causing the pan or lid to rise in case of fire and close the tank; secondly, in means for preventing the charging of the tank and its contents with static electricity of different polarity, and thus obviating any static discharge which would ignite the inflammable gases; thirdly, in the peculiar construction and arrangement of an automatic cut-off in the filling-pipe of the tank, which cut-off is controlled by the movement of the rising and falling pan; fourthly, in the peculiar form of the lid or pan; fifthly, in the combination, with the lid or pan, of a supplemental float attached to the bottom of the pan; and, sixthly, in the peculiar means for equalizing the movements of the pan, all as hereinafter more fully described.

In the drawings, A represents the tank, which at its upper edge is provided with an inturned and pendent or dropping flange, $a$. This flange may be curved, as shown in Fig. 1, or angular, as in Fig. 2.

B is the floating lid or cover, which is made in the form of a pan open at the top and of such diameter as to move freely up and down in the tank, guide-rollers $g$ being fixed to the edges of such pan to facilitate such free movement. This pan normally floats on the surface of the oil, and is partially sustained by several non-combustible flexible connections $b$, which may be either in the nature of chains or wire ropes, and which, after passing over pulleys $a'$ at the top of the tank, are attached to counterpoises $b^2$. This pan B, instead of being a plain open pan, as in my previous patent, is provided with a concentrically-arranged inverted pan, $i$, which forms between its outer edges and the sides of the pan B an annular trough, O, which receives the drooping flange $a$. This inverted pan $i$, it will be seen, by displacing a portion of the water of pan B, materially lightens the latter as a float, and yet preserves the proper depth of water in the trough O to form the seal. Beneath the inverted pan $i$, and between the same and the bottom of the pan B, may be a filling, $k$, of some material which is a non-conductor of heat, so that the surface of the oil may not be affected by the variations in the external temperature. In the pan B, and covering the pan $i$ to a slight depth, is placed the water which makes the seal in trough O, and which also, by gradual evaporation over the entire surface of the pan, keeps the lid or floating cover cool, and correspondingly cools the surface of the oil.

Now, in providing means for closing the tank in case of fire, I destroy automatically the balance between the pan B and the counterpoise $b^2$, making the relative weight of the pan less, which causes it to at once rise and form a tight seal. For accomplishing this the heat of the burning gases is made to destroy the integrity of a check that normally preserves such balance. In practice I may use two different methods. One is to lighten the weight of the pan, leaving the counter-weights constant, and the other is to leave the weight of the pan constant and increase the weight of the counter-weights. In practicing the first method, in which the pan is lightened, I form in the side of the pan B an opening, in which I place a tube, $e'$, which is normally closed by wax, fusible metal, an explosive composition, or any other substance whose integrity is destroyed by the high temperature of the flame. As soon as this tube is thus opened by the flames a part of the water in the pan runs out into the tank A, and the pan being thus lightened, it rises. This tube or fusible plug $e'$ should be such distance from the bottom of the pan that after the pan has been sufficiently lightened there will still be water enough in the trough O to make a sealed joint with flange $a$. The other method of effecting this result consists (see Fig. 2) of elbow-levers $f f^2$, fulcrumed upon the top of the tank, and one of the arms of each of which levers is bifurcated and sustains a supplemental weight, $f'$, surrounding the wire rope $b$, and the other arms, $b^2$, of which opposite elbow-levers are tied together by a combustible cord, $f^3$, so that when the cord burns in two the weight $f'$ falls upon the counterpoise $b^2$, and by destroying the equilibrium between the latter and the pan causes the latter to ascend and form the water seal.

In the investigation of the apparently mysterious causes of the ignition of petroleum-tanks I have abundant reason to believe that one fruitful cause is the ignition of the inflammable gases by a spark of electricity caused by a static charge of one polarity in the tank and a charge of another polarity in the oil in the tank. It has been found that there is a deposit from crude petroleum upon the sides and bottom of the tank which is a non conductor of electricity, and when this deposit forms the metal of the tank is insulated from the oil, and the tank itself being in electrical connection with the earth, and the oil in the tank being in electrical connection with the air and clouds by the ascending fumes of the volatile hydrocarbon, this state of affairs causes the tank to become charged with static electricity of one polarity and the bulk of petroleum to become charged with static electricity of an opposite polarity, which two factors are held in the tank in the relation of the charge of a Leyden jar until such condition is broken by a discharge with accompanying spark, brought about by a vibration or increased conductivity of the atmosphere or other causes.

One feature of my invention consists in means for avoiding the existence of such conditions. For this purpose I combine with the tank a metal which forms with the metal of the tank (or with another metal) a galvanic pair, the electro-positive element, or the element which is attacked by the acidulous liquid, being always in contact with the oil and kept clean and free from deposit by reason of the galvanic current set up by the acid matters of the petroleum, so that there is always a clean metal surface in contact with the oil, which establishes an electrical connection between the oil and the tank, despite the non-conducting film, and by which provision there is no accumulated static charge, but the oil and the tank are preserved in perfect electrical equilibrium. When the tank is made of iron I prefer to use two metals—copper and zinc—because to make a perfect conduction through the tank the additional metal must be riveted in the tank, and if but one metal is used the tank itself forms the other element of the pair, and the dissolving influence of the acidulous liquid would soon cause the electro-positive metal to be eaten away at the rivet and leak. I therefore use copper rivets $e$ and a zinc strip, $d$, which makes a pair of the zinc and copper and causes the zinc strip always to be kept clean by maintaining an electro-positive relation to the rivets, without involving the loosening of the rivets, and still preserving the electrical connection between the oil, zinc strips, copper rivet, and the tank, which effects the desired electrical equilibrium. In addition to the provision on the sides of the tank I may place on the lower side of the pan B alternate zinc strips $d^2$ and copper strips $d'$, connected in pairs, and effecting electrical connection between the tank and oil by the wire rope $b$ and pan B. The success of this arrangement, it will be seen, relies upon the electrical conductivity between the tank and oil, which the necessarily clean surface of the electro-positive metal affords.

I am aware of the fact that a similar provision of galvanic plates has been used in steam-boilers with a view to avoid an alleged lack of electric equilibrium which was supposed to exist between the boiler and the steam in consequence of the insulating-scale on the inside of the boiler, and which lack of equilibrium was supposed to result in a spark that ignited supposed inflammable gases in the boiler produced by the decomposition of steam. In my case, however, my application of these means differs from that used in steam-boilers in that the fact is universally admitted that lightning flashes do pass from the clouds to the earth, and vice versa, in consequence of a lack of electric equilibrium of these two elements, and the fact is established that these hydrocarbon vapors are inflammable, and there is, moreover, such a connection of the tank to the earth on the one hand and of the oil to the clouds (by the ascending hydrocarbon vapors) on the other as to provide all the conditions for the ignition of the oil in the tanks which it is my object to avoid. Furthermore, even in tanks that are closed at the top there are stored up in the tank and oil in the tank two static charges of electricity, due to electricity flowing into the same with the oil from the long lines of pipe. Thus, even when the oil in the tank is not in electrical connection with the clouds by the ascending column of hydrocarbon vapors, still two different charges of electricity will flow into the tank and oil from the line of pipe, for it will be remembered that the same conditions exist in the inflow-pipe as to the insulating lining, and as the oil flows into the tank it carries its own charge of electricity, while a counter-charge of electricity is induced thereby in the metal of the pipes, thus producing in the tank an accumulated charge of a similar character to that first described.

In connection with the pan B, I use a supplemental bottom or float, D. This is made of some material lighter than the oil, and is normally suspended beneath the pan B by combustible connections $k^2$. The object of this supplemental bottom is as follows: If the tank becomes inflamed and the pan B is raised, automatically or otherwise, to close the top of the tank, it will be seen that as soon as the pan leaves the surface of the oil in its ascent the whole surface of the oil is exposed to the flames. For preventing this exposure the fire burns off the connections $k^2$ of the supplemental bottom and leaves the latter resting on the surface of the oil, while the pan B rises to seal the tank. For equalizing the vertical movement of the different sides of the pan the wire ropes $b$ are attached, not to the pan itself, but to an endless chain, $b'$, that passes around pulleys $p$, located on the pan.

H is a lever, fulcrumed upon a standard mounted on the top of the tank. This lever connects outside the tank with a rod, $h^2$, that at its lower end is attached to the arm of the cock $h^3$ in the inlet-pipe $m$. On the other end of the lever H is a weight, $h$, which normally holds the cock $h^3$ open, and also a pendent rod, $h'$, which is struck by the pan B in rising and is made to close cock $h^3$, so that when a fire takes place the closing of the tank by pan B and the stoppage of the inflow of oil are effected automatically at one and the same time.

I am aware of the fact that inlet-cocks to tanks have been controlled by rising-and-falling floats, and do not claim this. In my invention it will be seen that the closing of the filling-cock is effected, not simply by the rise of float, depending on the level of the oil, but independently of this by the contingency of fire, in which case the pan leaves the level of the oil.

Having thus described my invention, what I claim as new is—

1. The combination of a petroleum-tank having an inturned drooping flange at its upper edge, a lid or pan provided with a liquid sealing medium, a counterpoise for balancing the said pan, a non-combustible flexible connection passing over pulleys at the top of the tank and connected at one end to the pan and at the other end to the counterpoise, and a check, substantially as described, adapted to normally maintain or preserve the balance of the pan and counterpoise, which check is made of a material whose integrity is destroyed by heat to allow the pan and counterpoise to be thrown out of equilibrium and the pan to ascend automatically to seal the tank, as set forth.

2. The combustible tie $f^3$, the elbow-levers $f$ $f^2$, and the supplemental weight $f'$, in combination with the petroleum-tank having inturned drooping flange at its upper edge, the lid or pan provided with a liquid sealing medium, the flexible connection $b$, and counterpoise $b^2$, substantially as and for the purpose described.

3. The combination, with a metallic petroleum-tank, of a strip or piece of metal secured to the metal of the tank, the said tank and piece of metal having an electro-positive and electro-negative relation, produced by the petroleum contained in said tank, for the purpose of avoiding the accumulation of static electricity of different polarity in the tank and oil, as described.

4. The combination, with a petroleum-tank having an inlet-cock, of a sealing-lid to close the tank at the top, and intervening mechanism connecting the lid with the cock for simultaneously closing the said inlet-cock by the movement of the lid, as and for the purpose described.

5. The floating lid B for a petroleum-tank, consisting of a pan having a smaller concentric pan, $i$, inverted, and forming an annular trough, O, in combination with a tank, as described.

6. The combination, with a tank, A, and the sealing-lid B, of a supplemental float, D, secured to the lid B by a combustible connection, and adapted, in case of fire, to part from the lid and cover the surface of the oil in the tank, as described.

7. The combination, with the tank A and the counterpoise $b^2$ and lid B, of the endless chain $b'$, passing around rollers attached to said lid, and the flexible connections $b$, attached to said chain and the counterpoise, substantially as and for the purpose described.

In testimony whereof I affix my signature in presence of two witnesses.

GEO. W. KING.

Witnesses:
 WM. C. O'NEAL,
 S. F. S. KING.